(12) United States Patent
Oyama et al.

(10) Patent No.: US 6,414,838 B1
(45) Date of Patent: Jul. 2, 2002

(54) CYLINDRICAL ELECTRIC DOUBLE-LAYER CAPACITOR

(75) Inventors: Shigeki Oyama; Minoru Noguchi, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,273

(22) Filed: Aug. 9, 2000

(30) Foreign Application Priority Data

Aug. 10, 1999 (JP) ............................................ 11-226716
Aug. 10, 1999 (JP) ............................................ 11-226718

(51) Int. Cl.[7] .............................. H01G 4/32; H01G 9/02
(52) U.S. Cl. ........................ 361/511; 361/512; 361/502
(58) Field of Search ................................. 361/502, 511, 361/512, 517–519, 530, 535–538, 301.5

(56) References Cited

U.S. PATENT DOCUMENTS

| 3,340,444 | A | * | 9/1967 | Selke | ......................... 361/511 |
| 4,480,290 | A | * | 10/1984 | Constanti et al. | ........... 361/512 |
| 5,150,283 | A | * | 9/1992 | Yoshida et al. | ............. 361/502 |
| 5,379,181 | A | * | 1/1995 | Ishii | .......................... 361/511 |

\* cited by examiner

*Primary Examiner*—Anthony Dinkins
(74) *Attorney, Agent, or Firm*—Arent Fox Kintner Plotkin & Kahn PLLC

(57) ABSTRACT

A cylindrical electric double-layer capacitor includes an electrode winding which is formed by superposing band-shaped positive and negative electrodes one on another with a first separator interposed therebetween, superposing a second separator onto one of the band-shaped positive and negative electrodes to provide a superposed material, and by spirally winding the superposed material such that the second separator is located on an outermost side, and a container having the electrode winding accommodated therein. A cylindrical electrode is provided on an inner peripheral surface of the container opposed to an outer peripheral surface of the electrode winding. The polarity of the cylindrical electrode is set at a polarity opposite from the polarity of that portion of the band-shaped negative electrode, which is located on an outermost periphery of the electrode winding.

4 Claims, 14 Drawing Sheets

CYLINDRICAL ELECTRIC DOUBLE-LAYER CAPACITOR

BACKGROUND OF THE INVENTION

1. Field of the Invention

The present invention relates to a cylindrical electric double-layer capacitor.

2. Description of the Related Art

There is a conventionally known cylindrical electric double-layer capacitor including an electrode winding which is formed by superposing a band-shaped positive electrode and a band-shaped negative electrode one on another with a first separator interposed therebetween, superposing a second separator onto one of said band-shaped positive and negative electrodes to provide a superposed material and by spirally winding the superposed material such that the second separator is located on an outermost side, and a container having the electrode winding accommodated therein. In this case, in the electrode winding, that portion of one of the band-shaped positive and negative electrodes, which is located on an outermost periphery, namely, a last-lap annular outer peripheral surface, has no mating electrode opposed thereto.

Therefore, the conventionally known capacitor suffers from a disadvantage that the last-lap annular peripheral surface does not participate in the ensuring of the electrostatic capacity and hence, is useless and a difference between amounts of electrodes utilized for forming the band-shaped positive and negative electrodes causes an unbalance in potential to deteriorate the performance.

There is also a conventionally known cylindrical electric double-layer capacitor including an electrode winding which is formed by interposing one separator between band-shaped positive and negative electrodes expanded by the charging, superposing another separator onto one of said band-shaped positive and negative electrodes to provide a superposed material and by spirally winding the superposed material such that the another separator is located on an outermost side, and a container having the electrode winding accommodated therein. In this case, each of the band-shaped positive and negative electrodes is formed at a uniform thickness over the whole thereof using activated carbon as a predominant component. Examples of activated carbon expanded by the charging are alkali-activated carbon made from meso-phase pitch as a starting material.

The alkali-activated carbon has a high density and a high capacity and is extremely effective for enhancing the electrostatic capacity of a cylindrical electric double-layer capacitor. On the other hand, however, there is a possibility that the deformation or the like of the band-shaped positive and negative electrodes may occur to deteriorate the performance of the cylindrical electric double-layer capacitor. because the band-shaped positive and negative electrodes are expanded by the charging, as described above. Incidentally, such expansion advances in a given amount depending on the charged voltage, but little advances in a constant voltage charged state. The amounts of band-shaped positive and negative electrodes shrunk are smaller than the amounts of band-shaped positive and negative electrodes expanded.

SUMMARY OF THE INVENTION

Accordingly, it is an object of the present invention to provide a cylindrical electric double-layer capacitor of the above-described type, wherein entire opposite surfaces of the band-shaped positive and negative electrodes of the electrode winding are utilized effectively for ensuring an electrostatic capacity, and the deterioration in the performance can be inhibited to the utmost by the equalization of the amounts of electrodes utilized for the band-shaped positive and negative electrodes.

To achieve the above object, according to the present invention, there is provided a cylindrical electric double-layer capacitor comprising an electrode winding which is formed by superposing band-shaped positive and negative electrodes one on another with a first separator interposed therebetween, superposing a second separator onto one of the band-shaped positive and negative electrodes to provide a superposed material, and by spirally winding the superposed material such that the second separator is located on an outermost side, and a container having the electrode winding accommodated therein, wherein a cylindrical electrode is provided on an inner peripheral surface of the container opposed to an outer peripheral surface of the electrode winding, the polarity of the cylindrical electrode being set at a polarity opposite from the polarity of that portion of the one of the band-shaped positive and negative electrodes, which is located on an outermost periphery of the electrode winding.

If the cylindrical electric double-layer capacitor is constructed as described above, the last-lap annular outer peripheral surface which is a portion of one of the band-shaped positive and negative electrodes of the electrode winding has a mating electrode in opposed relation to the cylindrical electrode of the container having a polarity different from that of the last-lap annular outer peripheral surface with the second separator interposed therebetween. Thus, the entire opposite surfaces of the band-shaped positive and negative electrodes of the electrode winding can be utilized effectively for ensuring the electrostatic capacity, thereby increasing the electrostatic capacity to the value more than that in the conventionally known capacitor. In addition, the deterioration in the performance of the electric double-layer capacitor can be inhibited to the utmost by the equalization of the amounts of electrodes utilized for the band-shaped positive and negative electrodes.

It is another object of the present invention to provide a cylindrical electric double-layer capacitor of the above-described type, wherein the absolute amounts of band-shaped positive and negative electrodes expanded can be decreased to the values less than that in the conventionally known capacitor, and the absolute values of the weights of the band-shaped positive and negative electrodes can be maintained approximately equivalent to those in the conventionally known capacitor, whereby the deterioration in the performance can be inhibited to the utmost.

To achieve the above object, according to the present invention, there is provided a cylindrical electric double-layer capacitor comprising an electrode winding which is formed by interposing one separator between band-shaped positive and negative electrodes expanded by the charging, superposing another separator onto one of the band-shaped positive and negative electrodes to provide a superposed material, and by spirally winding the superposed material such that the other separator is located on an outermost side, and a container having the electrode winding accommodated therein, wherein the thickness of each of the positive and negative electrodes is decreased from a winding start point toward a winding end point.

In the electrode winding, the rate of increase in final thickness caused by the expansion of the band-shaped positive and negative electrodes is, for example, about 10% at the center portion, about 30% at an intermediate portion, and about 50% at an outer peripheral portion. The reason why the rate of increase in thickness is smaller at the center portion is that a clamping force provided by the winding is applied strongly to the center portion. On the other hand, the reason why the rate of increase in thickness is larger at the outer peripheral portion is that the clamping force applied to the outer peripheral portion is weak due to that a gap for fitting the electrode winding exists between the electrode winding and the container.

Therefore, when the band-shaped positive and negative electrodes are constructed as described above, the outer peripheral portion expanded in the largest amount can be formed at the smallest thickness to reduce the absolute amount of entire electrode winding expanded, as compared with the conventionally known capacitor, thereby avoiding the deformation or the like of the band-shaped positive and negative electrodes. On the other hand, the center portion expanded in the smallest amount can be formed at the largest thickness, whereby the absolute values of the weights of the band-shaped positive and negative electrodes can be maintained approximately equivalent to those in the conventionally known capacitor.

Thus, it is possible to inhibit the deterioration in the performance to the utmost, such as a decrease in electrostatic capacity, an increase in internal resistance and the like due to the expansion of the band-shaped positive and negative electrodes.

The above and other objects, features and advantages of the invention will become apparent from the following description of the preferred embodiment taken in conjunction with the accompanying drawings.

DESCRIPTION OF THE PREFERRED EMBODIMENTS

Embodiment I

Figure 1:
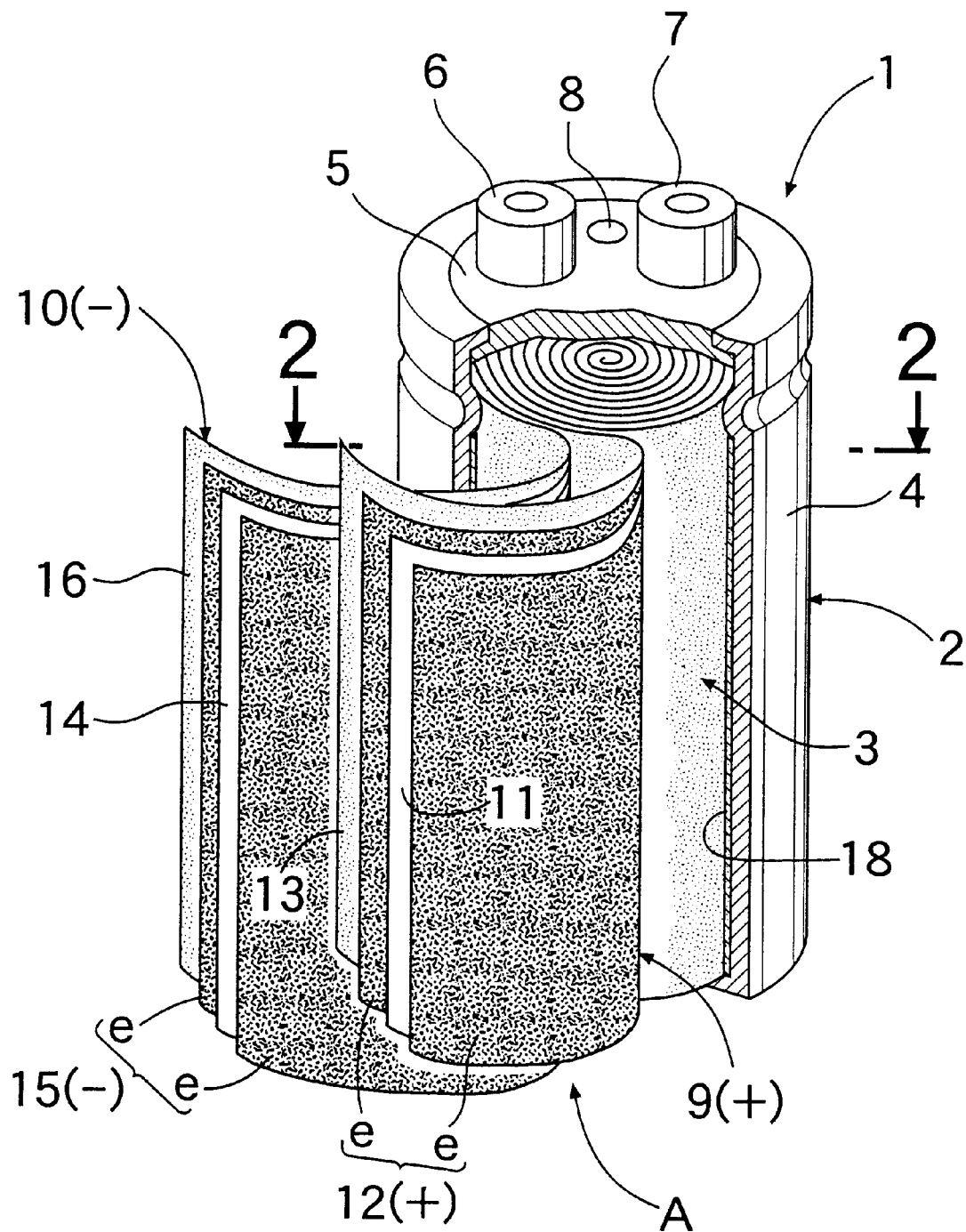
FIG. 1 is a cut-away perspective view of an essential portion of one example of a cylindrical electric double-layer capacitor.
Figure 2:
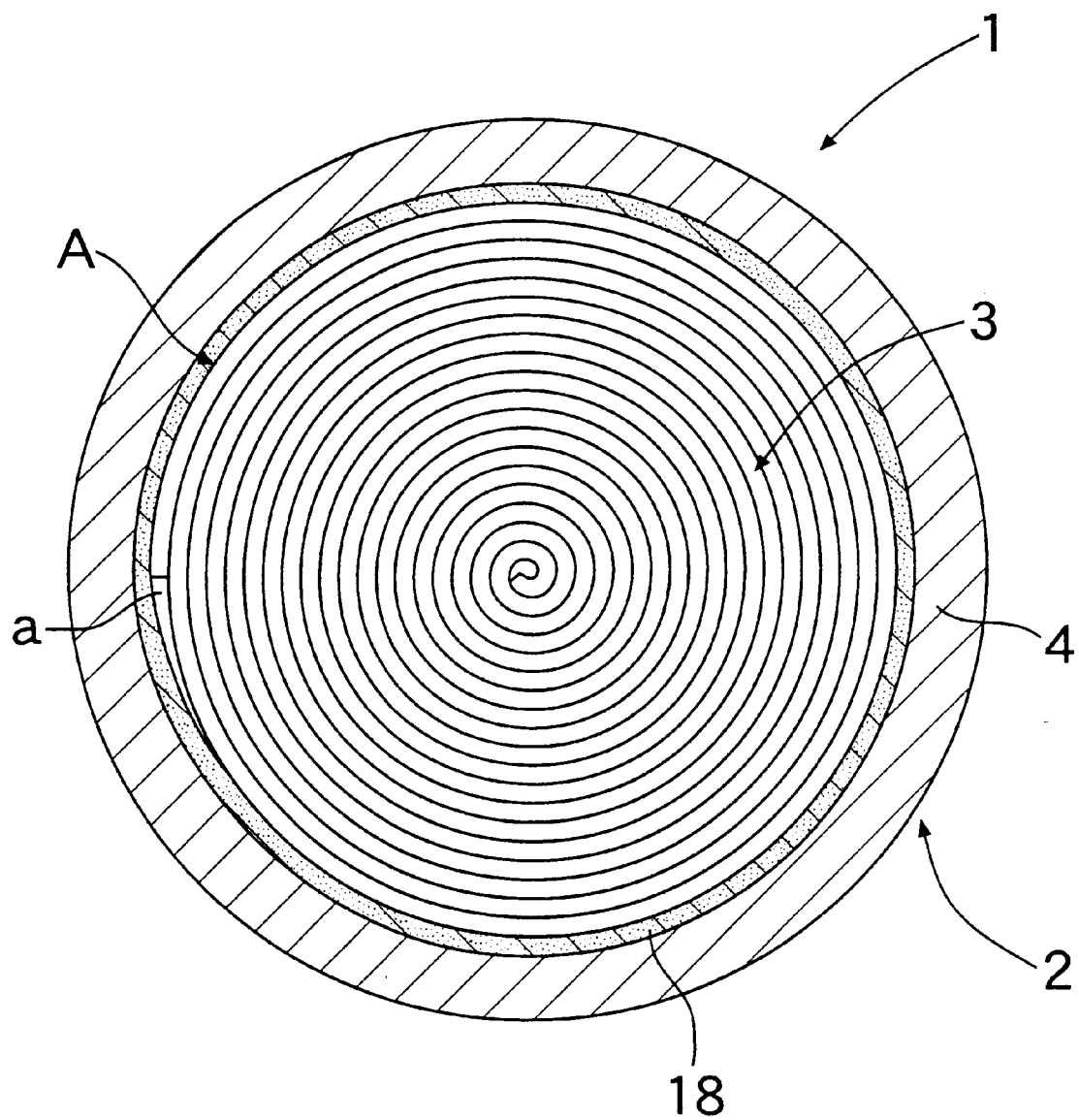
FIG. 2 is a sectional view taken along a line 2—2 in FIG. 1.
Figure 3:
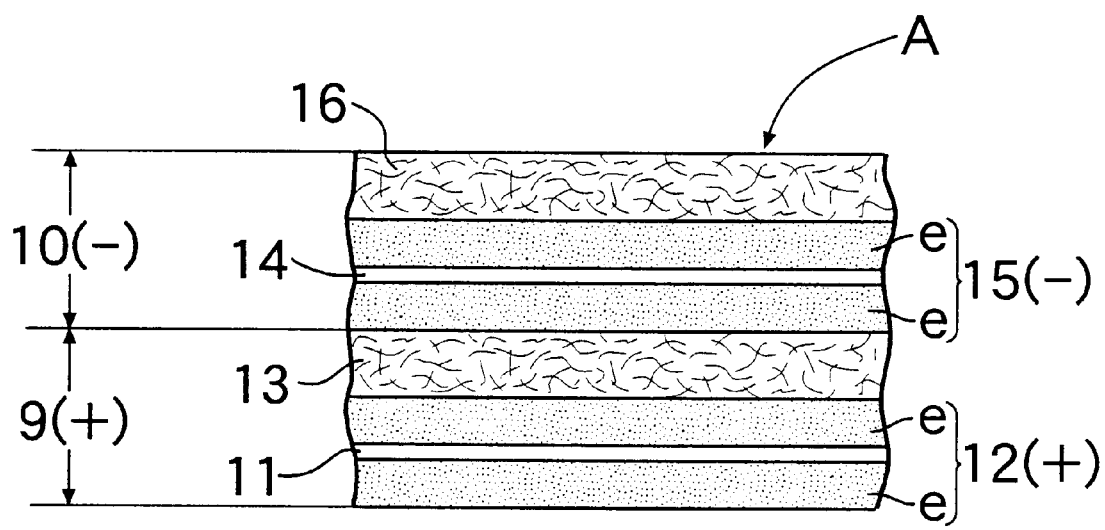
FIG. 3 is a side view of an essential portion of a superposed material comprising a positive electrode laminated band and a negative electrode laminated band.

Referring to FIGS. 1 and 2, a cylindrical electric double-layer capacitor 1 includes a container 2 made of aluminum (Al), an electrode winding 3 accommodated in the container 2, and an electrolyte poured in the container 2. The container 2 is comprised of a bottomed cylindrical body 4, and a terminal plate 5 which closes an opening in one end of the body 4. Positive and negative terminals 6 and 7 and a safety valve 8 are provided on the terminal plate 5.

The electrode winding 3 has a positive electrode laminated band 9 and a negative electrode laminated band 10. The positive electrode laminated band 9 comprises a band-shaped current colletor 11 made of an aluminum foil and having band-shaped polarizing electrodes e affixed respectively to opposite surfaces thereof by a conductive adhesive, and a first separator 13 made of PTFE (polytetrafluoroethylene) and superposed onto one of the band-shaped polarizing electrodes e. A band-shaped positive electrode 12 is formed by the pair of polarizing electrodes e. An electrolyte is retained in the first separator 13 in an impregnated manner. The negative electrode laminated band 10 comprises a band-shaped current colletor 14 made of an aluminum foil and having band-shaped polarizing electrodes e affixed respectively to opposite surfaces thereof by a conductive adhesive, and a second separator 16 made of PTFE and superposed onto one of the band-shaped polarizing electrodes e. A band-shaped negative electrode 15 is formed by the pair of polarizing electrodes e. An electrolyte is retained in the second separator 16 in an impregnated manner.

To produce the electrode winding 3, the first separator 13 of the positive electrode laminated band 9 is superposed onto the exposed polarizing electrode of the negative electrode laminated band 10. This forms a superposed material A comprising the band-shaped positive electrode 12 and the band-shaped negative electrode 15 superposed one on another with the first separator 13 interposed therebetween, and the second separator 16 superposed on one of the band-shaped positive and negative electrodes 12 and 15, e.g., the band-shaped negative electrode 15 in the illustrated embodiment. The superposed material A is wound spirally, so that the second separator 16 of the negative electrode laminated band 10 is located on an outermost side.

Each of the band-shaped positive and negative electrodes 12 and 15 is formed using, as a predominant component, alkali-activated carbon made from meso-phase pitch as a starting material in order to provide an increase in electrostatic capacity. A solution of quaternary ammonium borofluoride compound such as a solution of $TEMA.BF_4$ $[(C_2H_5)_3CH_3N.BF_4$ (triethylmethyl ammonium borofluoride), as a solute] in PC (propylene carbonate, as a solvent) may be used as the electrolyte.

Figure 4:
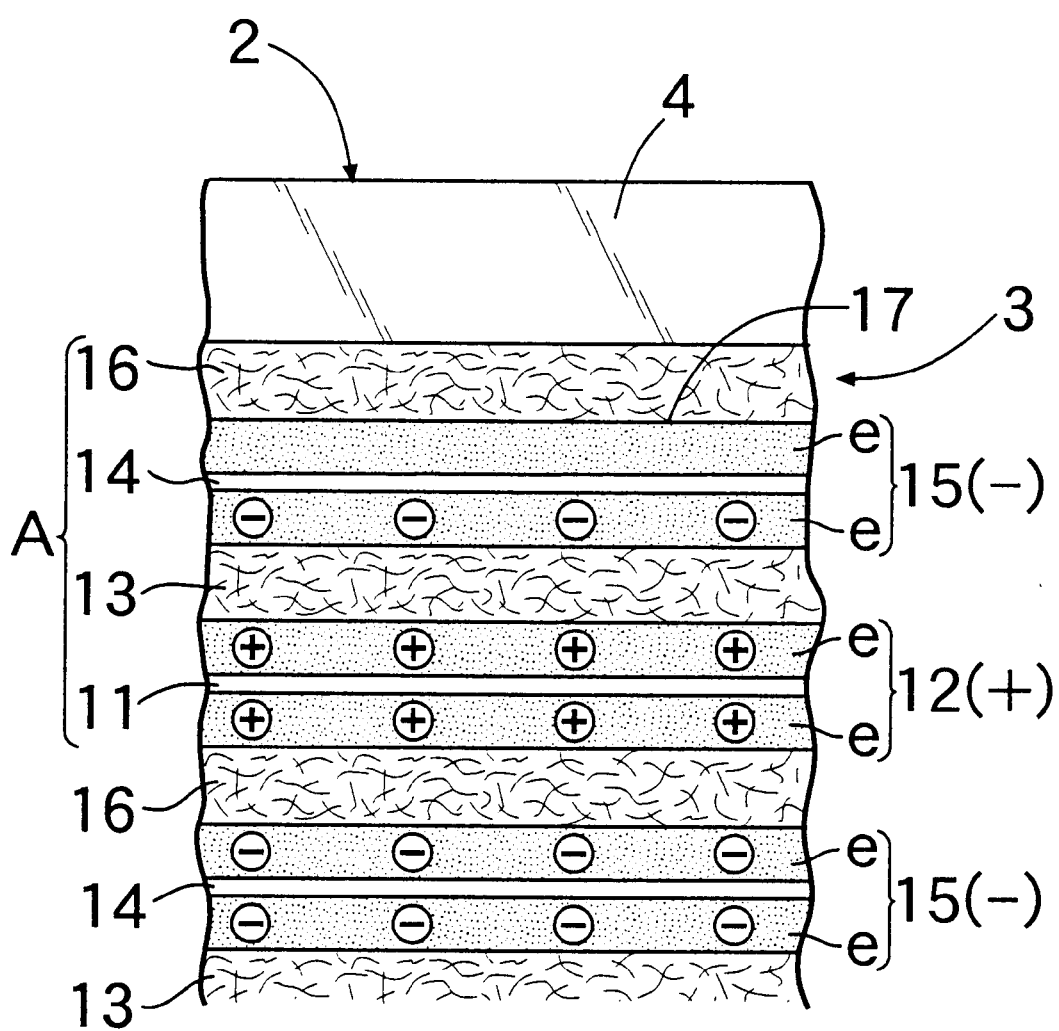
FIG. 4 is a view for explaining a charged state in a case where no cylindrical electrode exists on an inner peripheral surface of a container.

When the electric double-layer capacitor 1 including the bottomed cylindrical body 4 having an inner peripheral surface formed of an aluminum alloy is charged electrically, the last-lap annular peripheral surface 17 of the band-shaped negative electrode 15 in the electric winding 3 does not participate in the ensuring of the electrostatic capacity as shown in FIG. 4 and hence is useless.

Figure 5:
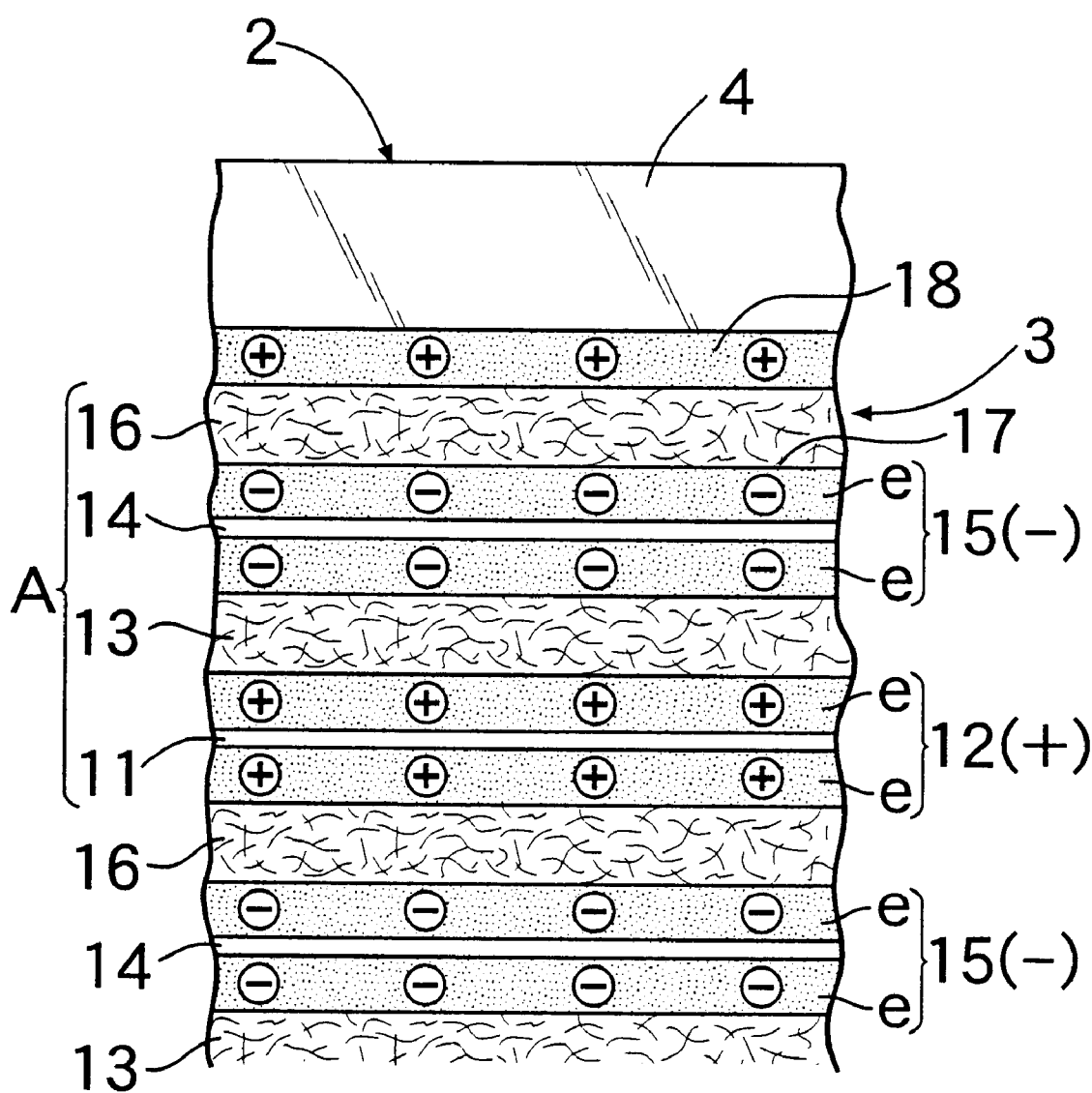
FIG. 5 is a view for explaining a charged state in a case where the cylindrical electrode exists on the inner peripheral surface of the container.

Therefore, a cylindrical electrode 18 is provided around an inner peripheral surface of the container 2 opposed to the outer peripheral surface of the electrode winding 3 and thus, around an inner peripheral surface of the bottomed cylindrical body 4, as shown in FIGS. 2 and 5. The polarity of the cylindrical electrode 18 is set at a pole opposite from the polarity of that portion of one of the band-shaped positive and negative electrodes 12 and 15, e.g., the band-shaped negative electrode 15 in the illustrated embodiment, which is located on the outermost peripheral lap of the electrode winding 3, namely, is set at a positive pole.

With the above configuration, the last-lap annular outer peripheral surface 17 of the band-shaped negative electrode 15 in the electrode winding 3 has a mating electrode in an opposed relation to the cylindrical electrode 18 of the container 2 having a polarity different from that of the last-lap annular outer peripheral surface 17, with the second separator 16 interposed therebetween. Thus, the entire opposite surfaces of the band-shaped positive and negative electrodes 12 and 15 of the electrode winding 3 can be utilized effectively in order to ensure an electrostatic capacity, thereby increasing the electrostatic capacity to the value more than that in the prior art. In addition, it is possible to suppress the deterioration in the performance of the electric double-layer capacitor 1 to the utmost by equalizing the amounts of electrodes utilized for forming the band-shaped positive and negative electrodes 12 and 15.

When the cylindrical electrode 18 is formed using the alkali-activated carbon made from the meso-phase pitch as the starting material, the polarity of the cylindrical electrode 18 is set at the positive pole, as described above. Thus, the oxidation current at the positive pole can be lowered, leading to an enhancement in durability of the positive electrode, and the cylindrical electrode 18 can be swelled and closely adhered to the second separator 16.

Particular examples will be described below.

Alkali-activated carbon, e.g., KOH-activated carbon in the embodiment, was produced as activated carbon from meso-phase pitch as a starting material by the following process:

(a) Massive meso-phase pitch was subjected to a pulverizing treatment at room temperature to produce a powder having an average particle size of 300 $\mu$m. Then, the powder was subjected to an insolubilizing treatment at 350° C. for 2 hours in the atmosphere and then to a carbonizing treatment at 700° C. for 1 hour in a nitrogen atmosphere, thereby producing a carbonized powder. (b) The carbonized powder and an amount of KOH two times the weight of the carbon of the carbonized powder were mixed together and then, the mixture was subjected to a potassium activating treatment as an alkali activating treatment at 800° C. for 5 hours in a nitrogen atmosphere, followed by post-treatments, i.e., the neutralization with hydrochloric acid, the washing and the drying, thereby producing KOH-activated carbon. (c) The KOH-activated carbon was subjected to a pulverizing treatment using a jet mill to provide a fine KOH-activated carbon powder having an average particle size of 30 $\mu$m. The fine KOH-activated carbon powder will be referred merely to as a KOH-activated carbon powder hereinafter.

EXAMPLE-1

The KOH-activated carbon powder, a graphite powder (a conductive filler) and PTFE (a binder) were weighed, so that a weight ratio of 85:12.5:2.5 was obtained. Then, the weighed materials were kneaded together, and the kneaded mixture was rolled to produce an electrode sheet having a thickness of 175 $\mu$m.

Two band-shaped polarizing electrodes e having a width of 95 mm and a length of 1,500 mm were cut out from the electrode sheet and then bonded to opposite surfaces of a band-shaped current collector 11 having a width of 105 mm, a length of 1,500 mm and a thickness of 40 $\mu$m using a conductive adhesive, respectively, thereby forming a band-shaped positive electrode 12. Thereafter, a first separator 13 having a thickness of 75 $\mu$m and made of PTFE was superposed onto one of the polarizing electrodes e to form a positive electrode laminated band 9.

Then, two band-shaped polarizing electrodes e having a width of 95 mm and a length of 1,500 mm were cut out from the electrode sheet and then bonded to opposite surfaces of a band-shaped current collector 14 having a width of 105 mm, a length of 1,500 mm and a thickness of 40 $\mu$m using a conductive adhesive, respectively, thereby forming a band-shaped negative electrode 15. Thereafter, a second separator 16 having a thickness of 75 $\mu$m and made of PTFE was superposed onto one of the polarizing electrodes e to form a negative electrode laminated band 10.

Then, the first separator 13 of the positive electrode laminated band 9 was superposed onto the exposed band-shaped polarizing electrode e of the negative electrode laminated band 10. The superposed material A was wound spirally, so that the second separator 16 of the negative electrode laminated band 10 was located on an outermost side, thereby producing an electrode winding 3.

On the other hand, a polarizing electrode e cut out from the electrode sheet and having a width of 95 mm and a length of 157 mm was bonded, using a conductive adhesive, to an inner peripheral surface of a bottomed cylindrical body 4 having an inside diameter of 50 mm and a length of 130 mm in a container 2, thereby forming a cylindrical electrode 18 having a length of 95 mm and a thickness of 175 μm.

Then, the electrode winding 3 and an electrolyte made by dissolving 1.5 moles of TEMA.BF$_4$ into a PC solvent were placed into the bottomed cylindrical body 4, and the opening in the bottomed cylindrical body 4 was closed using a terminal plate 5. In closing the opening, the current colletors 11 and 14 of the positive electrode laminated band 9 and the negative electrode laminated band 10 were connected to a positive terminal 6 and a negative terminal 7 of the terminal plate 5, respectively, and the cylindrical electrode 18 was connected to the positive terminal 6. This cylindrical electric double-layer capacitor 1 is called example (1). It should be noted that there is a relatively large gap a creased between an end of winding of the superposed material A and the cylindrical electrode 18 in FIG. 2, but this gap a has been formed for making Figure. In practice, such a gap a is not produced, because the superposed material A is extremely thin.

EXAMPLE-2

A KOH-activated carbon powder, a graphite powder (a conductive filler) as well as PTFE and PVDF (polyvinylidene fluoride as a binder) were weighed, so that a weight ratio of 80:12:2:6 was obtained. Then, N-methyl-2-pyrrolidone (as a solvent) in an amount of 5 times the weight of the weighed materials was added to the weighed materials, and they were mixed together, thereby provide a paste-shaped electrode mixture. The electrode mixture was applied over a width of 95 mm, a length of 1,500 mm and a thickness of 220 μm to opposite surfaces of a band-shaped current collector 11 having a width of 105 mm, a length of 1,500 mm and a thickness of 40 μm by a doctor blade process, and then, the resulting material was rolled to form a band-shaped positive electrode 12 comprising two band-shaped polarizing electrodes e having a thickness of 175 μm. Thereafter, a first separator 13 made of PTFE and having a thickness of 75 μm was superposed onto one of the band-shaped polarizing electrodes e to form a positive electrode laminated band 9.

Then, the electrode mixture was applied over a width of 95 mm, length of 1,500 mm and a thickness of 220 μm to opposite surfaces of a band-shaped current collector 14 having a width of 105 mm, a length of 1,500 mm and a thickness of 40 μm by a doctor blade process, and then, the resulting material was rolled to form a band-shaped negative electrode 15 comprising two band-shaped polarizing electrodes e having a thickness of 175 μm. Thereafter, a second separator 16 made of PTFE and having a thickness of 75 μm was superposed onto one of the polarizing electrodes e to form a negative electrode laminated band 10.

Then, the first separator 13 of the positive electrode laminated band 9 was superposed onto the exposed band-shaped polarizing electrode e of the negative electrode laminated band 10. The superposed material was wound spirally, so that the second separator 16 of the negative electrode laminated band 10 was located on an outermost side, thereby producing an electrode winding 3.

On the other hand, the electrode mixture was applied by a doctor blade process to an inner peripheral surface of a bottomed cylindrical body 4 having an inside diameter of 50 mm and a length of 130 mm in a container 2 to form a cylindrical electrode 18 having a length of 95 mm and a thickness of 175 μm.

Then, the electrode winding 3 and an electrolyte made by dissolving 1.5 moles of TEMA.BF$_4$ into a PC solvent were placed into the bottomed cylindrical body 4, and the opening in the bottomed cylindrical body 4 was closed using a terminal plate 5. In closing the opening, the current colletors 11 and 14 of the positive electrode laminated band 9 and the negative electrode laminated band 10 were connected to a positive terminal 6 and a negative terminal 7 of the terminal plate 5, respectively, and the cylindrical electrode 18 was connected to the positive terminal 6. This cylindrical electric double-layer capacitor 1 is called example (2).

EXAMPLE-3

A cylindrical electric double-layer capacitor 1 having a structure similar to that of the example (2) was produced as a comparative example in the same manner, except that a bottomed cylindrical body 4 having no cylindrical electrode 18 on its inner peripheral surface was used. This cylindrical electric double-layer capacitor 1 is called a comparative example. [Performance of electric double-layer capacitor]

Table 1 shows initial performances of examples (1) and (2) and the comparative example.

TABLE 1

|  | Initial performance | |
| --- | --- | --- |
|  | Internal resistance (mΩ) | Electrostatic capacity (F) |
| Example (1) | 3.0 | 3173 |
| Example (2) | 2.9 | 3181 |
| Comparative Example | 4.0 | 2986 |

It can be seen from Table 1 that there is not a significant difference in internal resistance between examples (1) and (2) and the comparative example, but the electrostatic capacity in each of examples (1) and (2) is about 6% higher than that in the comparative example. This is attributable to that the entire opposite surfaces of the band-shaped positive and negative electrodes 12 and 15 of the electrode winding 3 were utilized effectively for ensuring the electrostatic capacity owing to the presence of the cylindrical electrode 18.

Figure 6:
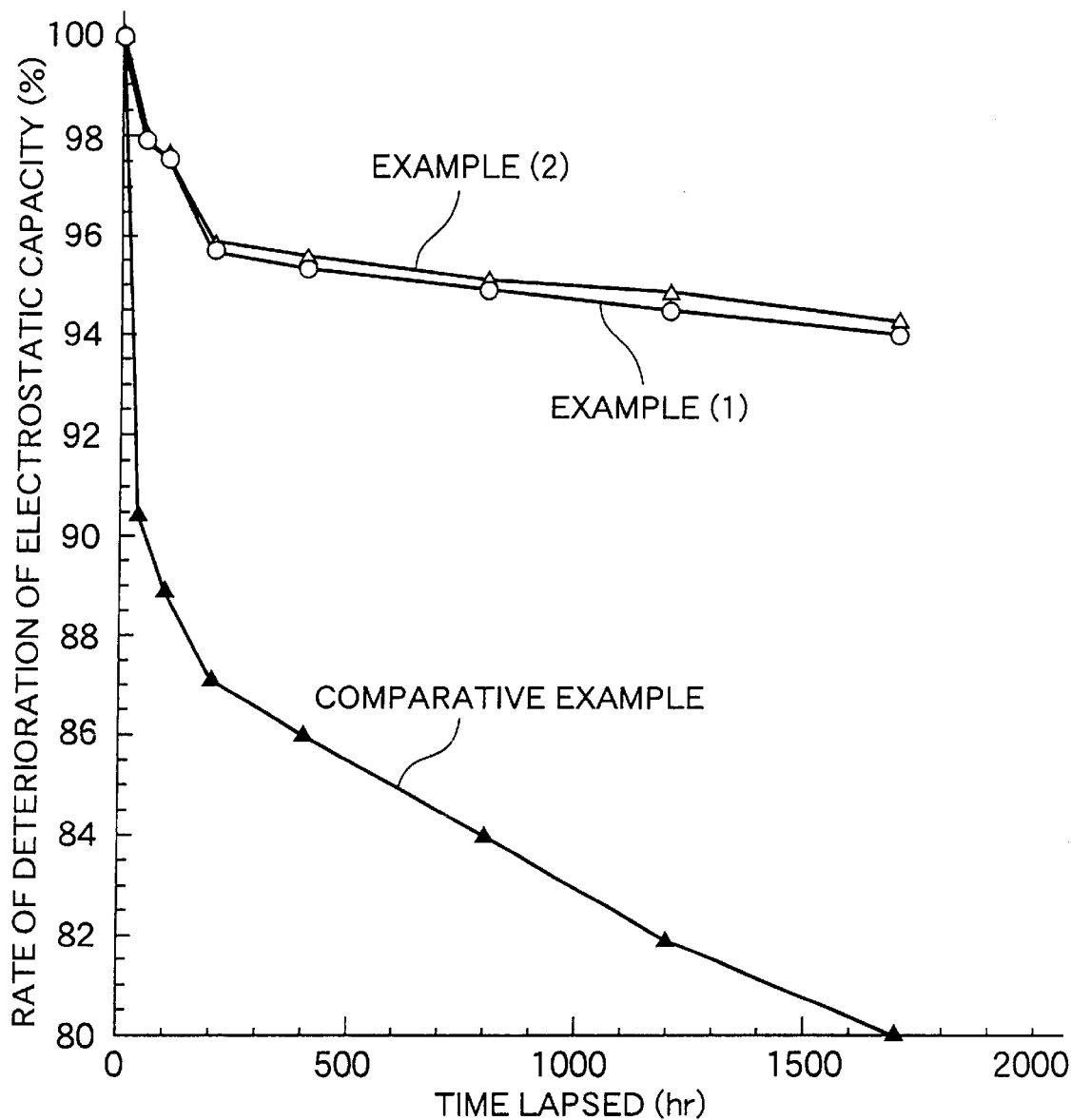
FIG. 6 is a graph showing the relationship between the time lapsed and the rate of deterioration of the electrostatic capacity.
Figure 7:
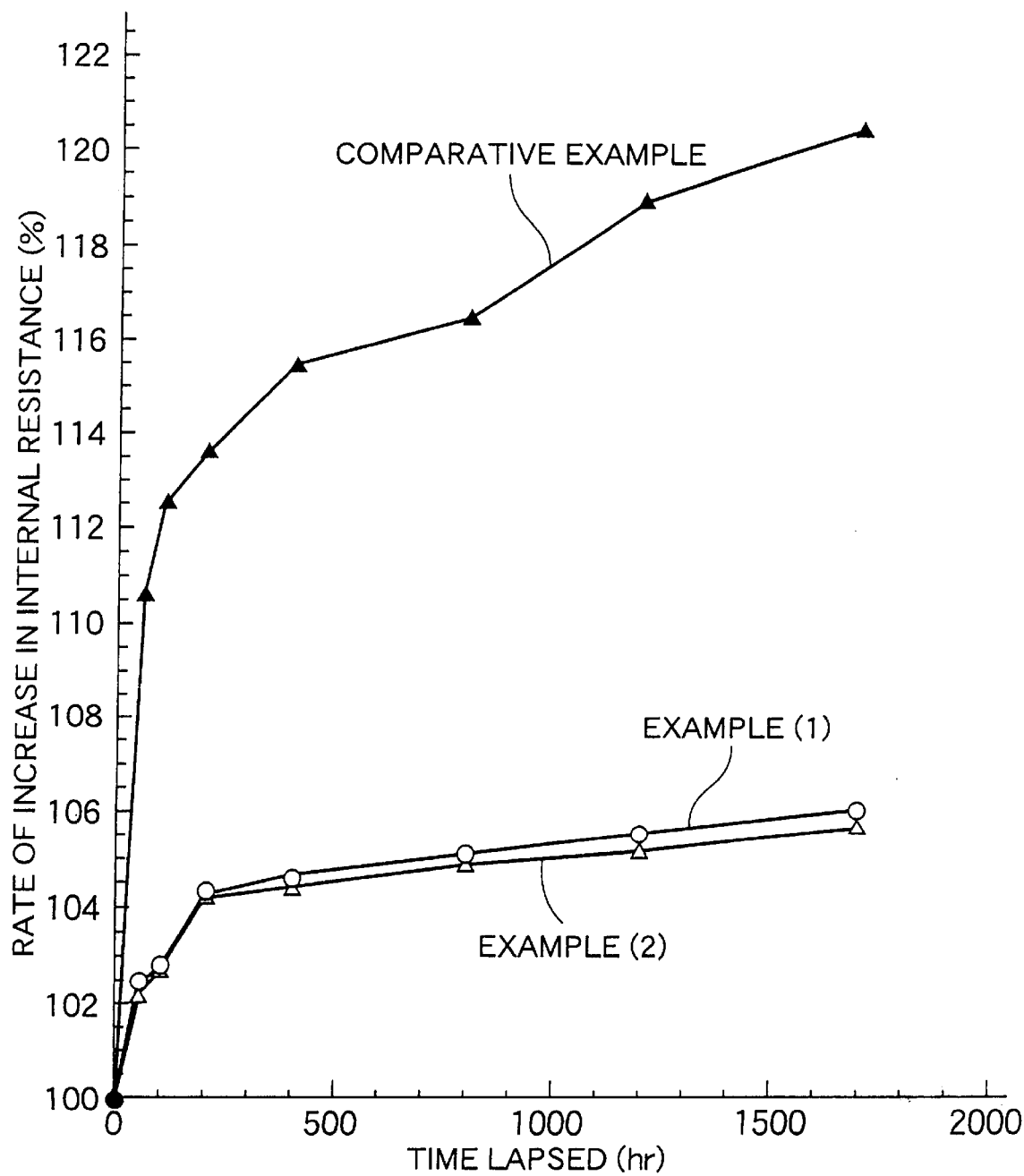
FIG. 7 is a graph showing the relationship between the time lapsed and the rate of increase in internal resistance.

Then, a rate of deterioration of the electrostatic capacity and a rate of increase in internal resistance for each of examples (1) and (2) and the comparative example were measured by carrying out the continuous application of voltage at 2.5 V for 1,700 hours in an atmosphere at 45° C. with the service life taken into consideration, thereby providing results shown in FIGS. 6 and 7. The rate B of deterioration of the electrostatic capacity was determined according to an equation, $B=(D/C)\times100$ (%), wherein C represents an initial electrostatic capacity, and D represents an electrostatic capacity after lapse of a predetermined time. The rate E of increase in internal resistance was determined according to an equation, $E=(G/F)\times100$ (%), wherein F represents an initial internal resistance, and G represents an internal resistance after lapse of a predetermined time. It can be seen from FIGS. 6 and 7 that both of the rate of deterioration of the electrostatic capacity and the rate of increase in internal resistance in examples (1) and (2) are low, as compared with the comparative example, and each of examples (1) and (2) has a high service life. This is attributable to that the amounts of electrodes utilized for forming the band-shaped positive and negative electrodes 12 and 15 were equalized owing to the presence of the cylindrical electrode 18.

The reason why the rate of deterioration of the electrostatic capacity and the rate of increase in internal resistance were varied over a long time was the generation of gas or the like.

According to Embodiment I, it is possible to provide a cylindrical electric double-layer capacitor having an increased electrostatic capacity and an excellent durability.

Embodiment II

Figure 8:
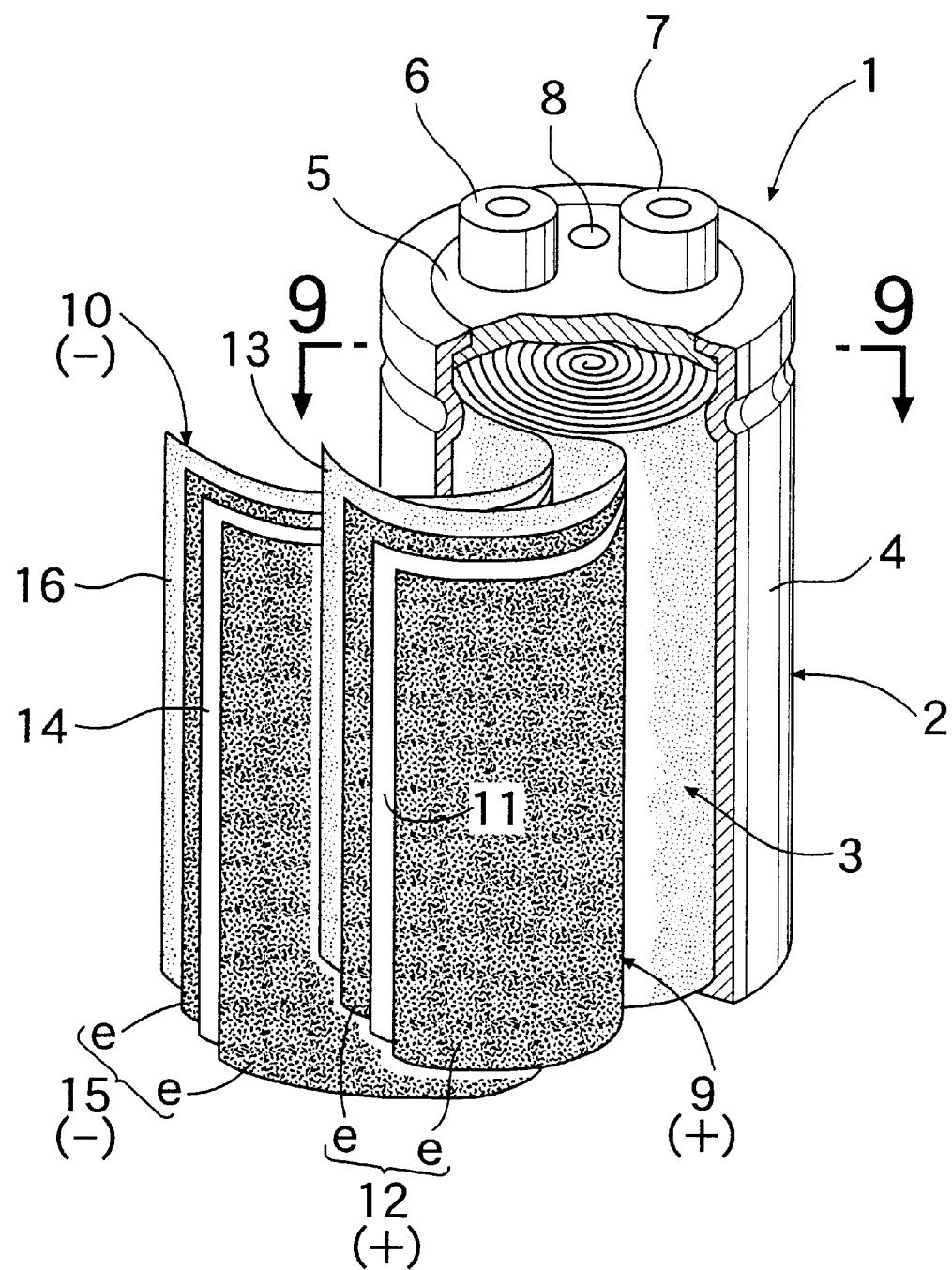
FIG. 8 is a cut-away perspective view of an essential portion of anther example of a cylindrical electric double-layer capacitor.

Referring to FIG. 8, a cylindrical electric double-layer capacitor 1 includes a container 2 made of aluminum (Al), an electrode winding 3 accommodated within the container 2, and an electrolyte poured into the container 2. The container 2 comprises a bottomed cylindrical body 4, and a terminal plate 5 which closes an opening in one end of the bottomed cylindrical body 4. Positive and negative terminals 6 and 7 and a safety valve 8 are provided on the terminal plate 5.

The electrode winding 3 has a positive electrode laminated band 9 and a negative electrode laminated band 10. The positive electrode laminated band 9 comprises a band-shaped current collector 11 made of an aluminum foil and having band-shaped polarizing electrodes e affixed respectively to opposite surfaces thereof by a conductive adhesive, and a first separator 13 made of PTFE (polytetrafluoroethylene) and superposed onto one of the band-shaped polarizing electrodes e. A band-shaped positive electrode 12 is formed by the pair of polarizing electrodes E. An electrolyte is retained in the first separator 13 in an impregnated manner. The negative electrode laminated band 10 comprises a band-shaped current collector 14 made of an aluminum foil and having band-shaped polarizing electrodes e affixed respectively to opposite surfaces thereof by a conductive adhesive, and a second separator 16 made of PTFE and superposed onto one of the band-shaped polarizing electrodes e. A band-shaped negative electrode 15 is formed by the pair of polarizing electrodes e. An electrolyte is retained in the second separator 16 in an impregnated manner.

To produce the electrode winding 3, the first separator 13 of the positive electrode laminated band 9 is superposed onto the exposed polarizing electrode e of the negative electrode laminated band 10. The superposed material is wound spirally, so that the second separator 16 of the negative electrode laminated band 10 is located on an outermost side.

Each of the band-shaped positive and negative electrodes 12 and 15 is formed using, as a predominant component, alkali-activated carbon made from meso-phase pitch as a starting material. Therefore, both of the poles 12 and 15 are swelled by the charging.

A solution of quaternary ammonium borofluoride compound such as a solution of TEMA.BF$_4$ [(C$_2$H$_5$)$_3$CH$_3$N.BF$_4$ (triethylmethyl ammonium borofluoride), as a solute] in PC (propylene carbonate, as a solvent) may be used as the electrolyte.

In the cylindrical electric double-layer capacitor 1 according to the present invention, each of the band-shaped positive and negative electrodes 12 and 15 has a thickness decreased from a winding start point toward a winding end point. For decreasing the thickness, specifically, a measure for stepwise decreasing the thickness or a measure for linearly gradually decreasing the thickness may be employed.

Figure 9:
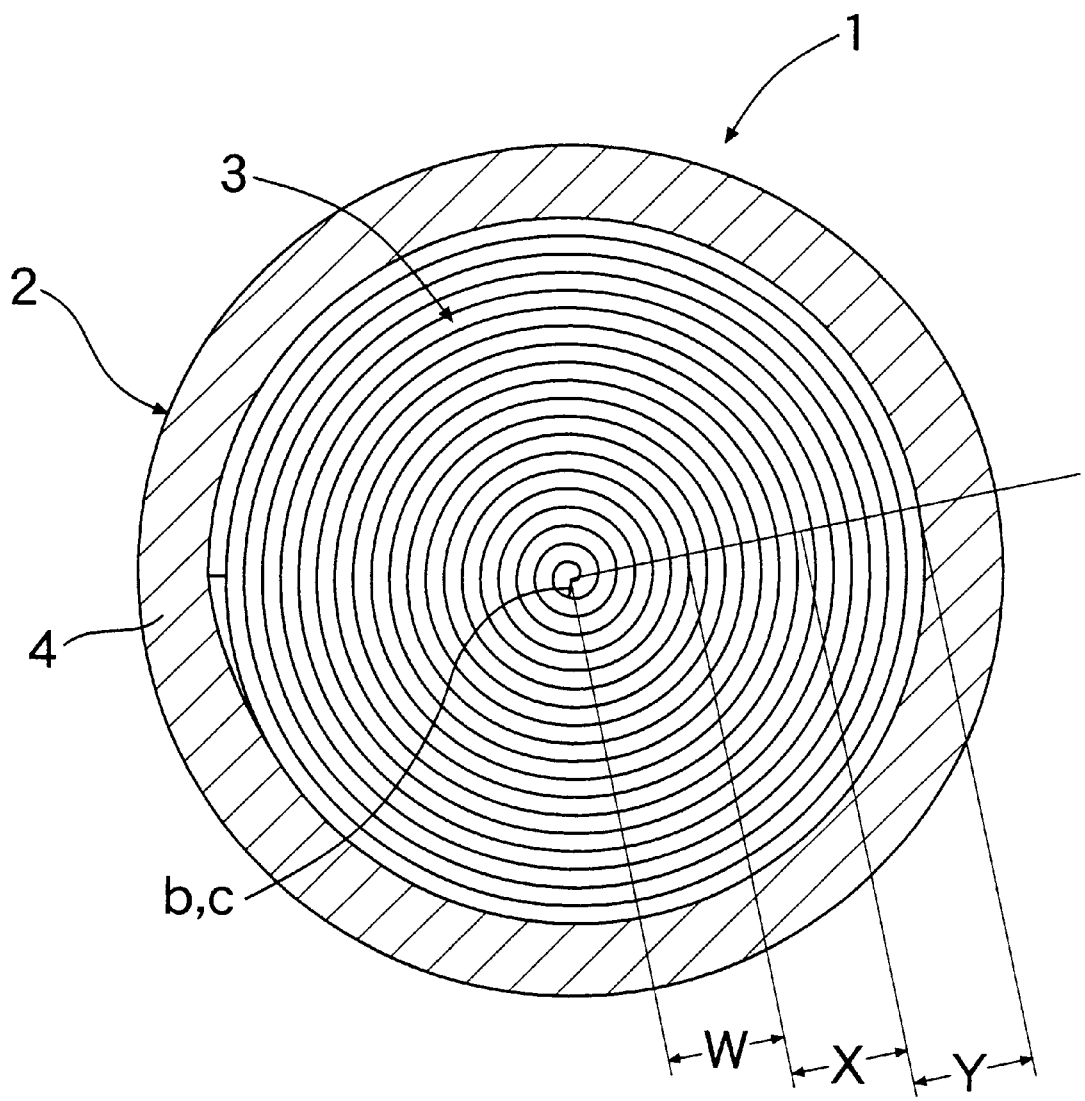
FIG. 9 is a sectional view taken along a line 9—9 in FIG. 8.

In the electrode winding 3, the rate of increase in final thickness caused by the swelling of the band-shaped positive and negative electrodes 12 and 15 is about 10% at the center portion W, about 30% at an intermediate portion X and about 50% at an outer peripheral portion Y, for example, as shown in FIG. 9. The reason why the rate of increase in thickness is smaller at the center portion W is that a clamping force provided by the winding is applied strongly to the center portion W. On the other hand, the reason why the rate of increase in thickness is larger at the outer peripheral portion Y is that a clamping force applied to the outer peripheral portion Y is weaker due to a gap for fitting of the electrode winding 3 being present between the electrode winding 3 and the bottomed cylindrical body 4.

Therefore, when the band-shaped positive and negative electrodes 12 and 15 are formed as described above, the outer peripheral portion Y having the largest amount of expansion can be formed at the smallest thickness to decrease the absolute amount of the entire electrode winding 3 expanded, as compared with the prior art. Thus, it is possible to avoid the deformation or the like of the band-shaped positive and negative electrodes 12 and 15. On the other hand, the center portion W having the smallest amount of expansion can be formed at the largest thickness to maintain the absolute values of the weights of the band-shaped positive and negative electrodes 12 and 15 approximately equivalent to those in the prior art.

Thus, it is possible to inhibit, to the utmost, the deterioration in the performance, such as a decrease in electrostatic capacity and an increase in internal resistance due to the expansion of the band-shaped positive and negative electrodes 12 and 15.

Particular examples will be described below.

Alkali-activated carbon, e.g., KOH-activated carbon in the embodiment, which is made from meso-phase pitch as a starting material and which is a predominant component for each of the band-shaped positive and negative electrodes 12 and 15, was produced in the following process:

(a) Massive meso-phase pitch was subjected to a pulverizing treatment at room temperature to produce a powder having an average particle size of 300 $\mu$m. Then, the powder was subjected to an insolubilizing treatment at 350° C. for 2 hours in the atmosphere and then to a carbonizing treatment at 700° C. for 1 hour in a nitrogen atmosphere, thereby producing a carbonized powder. (b) The carbonized powder and an amount of KOH two times the weight of the carbon of the carbonized powder were mixed together and then, the mixture was subjected to a potassium activating treatment as an alkali activating treatment at 800° C. for 5 hours in a nitrogen atmosphere, followed by post-treatments, i.e., the neutralization with hydrochloric acid, the washing and the drying, thereby producing KOH-activated carbon. (c) The KOH-activated carbon was subjected to a pulverizing treatment using a jet mill to provide a fine KOH-activated carbon powder having an average particle size of 30 $\mu$m. The fine KOH-activated carbon powder will be referred merely to as a KOH-activated carbon powder hereinafter.

EXAMPLE-1

Figure 10:
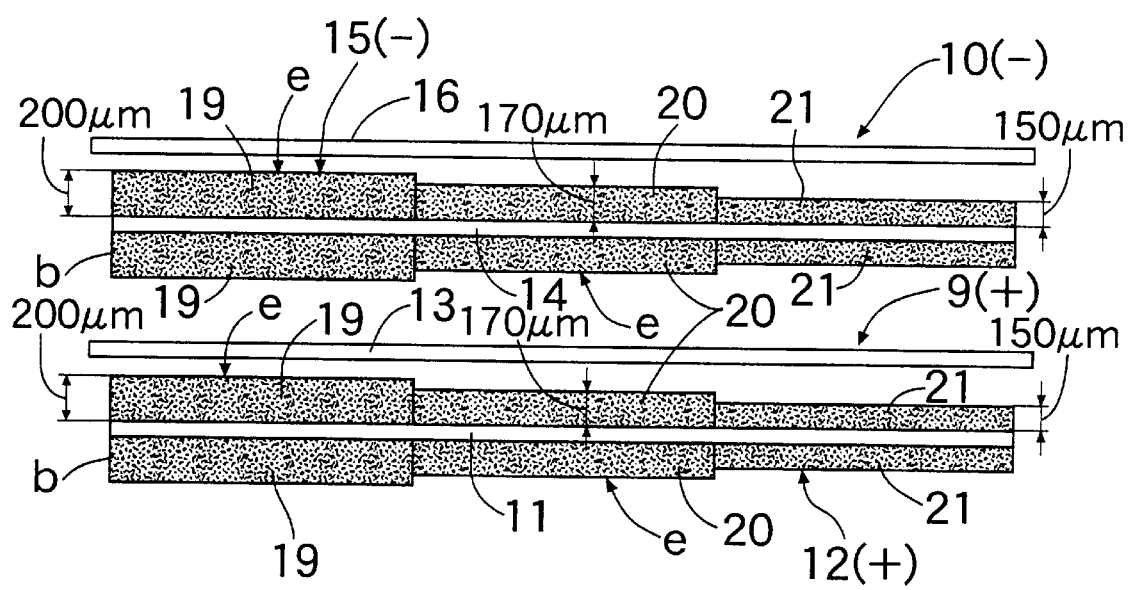
FIG. 10 is a diagram showing the relation between a positive electrode laminated band and a negative electrode laminated band in an example.

The KOH-activated carbon powder, a graphite powder (a conductive filler) and PTFE (a binder) were weighed, so that a weight ratio of 85:12.5:2.5 was obtained. Then, the weighed materials were kneaded together, and the kneaded mixture was rolled to produce three electrode sheets having a thickness of 200 $\mu$m, 170 $\mu$m and 150 $\mu$m, respectively. Plurality of band-shaped elements 19, 20 and 21 having a width of 95 mm and a length of 500 mm were cut out from each of the electrode sheets as shown in FIG. 10. A negative electrode laminated band 10 was produced using the three band-shaped elements 19, 20 and 21, a band-shaped current collector 14 having a width of 105 mm, a length of 1,500 mm and a thickness of 40 $\mu$m and a conductive adhesive and using a second separator 16 made of PTFE and having a thickness of 75 $\mu$m. In this case, each of the band-shaped elements 19 having a thickness of 200 $\mu$m was disposed on each of opposite surfaces of the current collector 14 at its lengthwise one end; each of the band-shaped elements 21 having a thickness of 150 $\mu$m was disposed on each of the opposite surfaces of the current collector 14 at the lengthwise other end; and each of the band-shaped elements 20 having a thickness of 170 $\mu$m was disposed on each of the opposite surfaces of the current collector 14 between both the band-shaped elements 19 and 21. A band-shaped polarizing electrode e was formed by the band-shaped elements 19, 20 and 21, and a band-shaped negative electrode 15 with its thickness decreased stepwise at a ratio of 2:1.7:1.5 from one end toward the other end was formed by the pair of polarizing electrodes e.

Further, a positive electrode laminated band 9 was produced using the three band-shaped elements 19, 20 and 21, a band-shaped current collector 11 and a conductive adhesive and using a first separator 13 having a thickness of 75 $\mu$m. In this case, each of the band-shaped elements 10 having a thickness of 200 $\mu$m was disposed on each of opposite surfaces of the collector 11 at its lengthwise one end; each of the band-shaped elements 21 having a thickness of 150 $\mu$m was disposed on each of the opposite surfaces of the collector 11 at the lengthwise other end, and each of the band-shaped elements 20 having a thickness of 170 $\mu$m was disposed on each of the opposite surfaces of the collector 11 between the band-shaped elements 19 and 21. A band-shaped polarizing electrode e was formed by the band-shaped elements 19, 20 and 21, and a band-shaped positive electrode 12 with its thickness decreased stepwise at a ratio of 2:1.7:1.5 from one end toward the other end was formed by the pair of polarizing electrodes e.

Then, the first separator 13 of the positive electrode laminated band 9 was superposed onto the exposed band-shaped polarizing electrode e of the negative electrode laminated band 10. The superposed material was wound spirally in a counterclockwise direction, as shown in FIG. 9, about an end b of the band-shaped element 19 having the thickness of 200 $\mu$m, so that the second separator 16 of the negative electrode laminated band 10 was located on an outermost side, thereby producing an electrode winding 3. The electrode winding 3 and an electrolyte made by dissolving 1.5 moles of TEMA.BF$_4$ into a PC solvent were placed into a bottomed cylindrical body 4 of a container 2 having an inside diameter of 50 mm and a length of 130 mm, and the opening in the bottomed cylindrical body 4 was closed using a terminal plate 5. In closing the opening, the current colletors 11 and 14 of the positive electrode laminated band 9 and the negative electrode laminated band 10 were connected to a positive terminal 6 and a negative terminal 7 of the terminal plate 5, respectively. This cylindrical electric double-layer capacitor 1 is called example (3).

EXAMPLE-2

Figure 11:
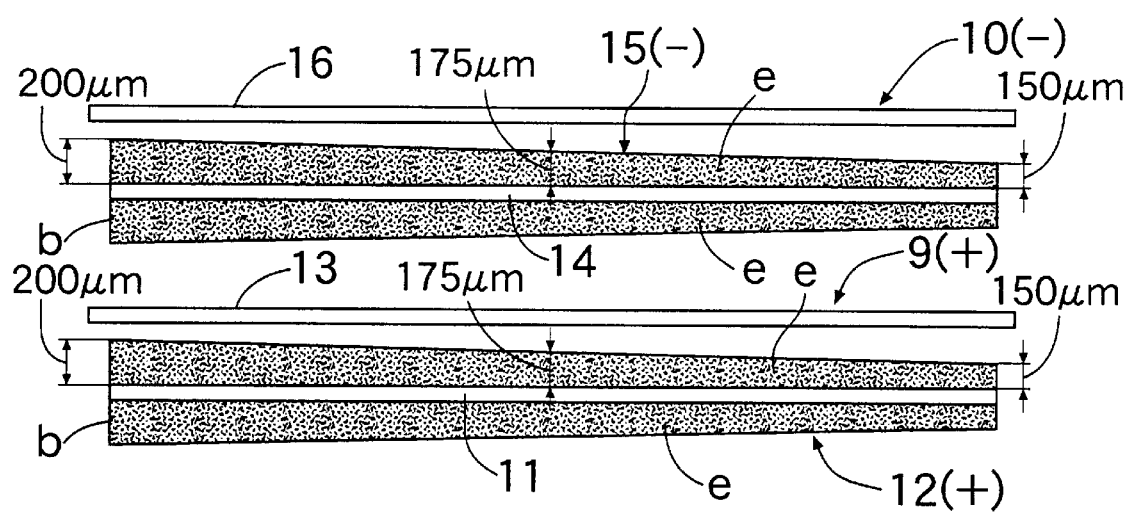
FIG. 11 is a diagram showing the relation between a positive electrode laminated band and a negative electrode laminated band in another example.

A KOH-activated carbon powder, a graphite powder (a conductive filler) as well as PTFE and PVDF (polyvinylidene fluoride as a binder) were weighed, so that a weight ratio of 80:12:2:6 was obtained. Then, N-methyl-2-pyrrolidone (as a solvent) in an amount of 5 times the weight of the weighed materials was added to the weighed materials, and they were mixed together, thereby provide a paste-shaped electrode mixture. The electrode mixture was applied over a width of 95 mm, a length of 1,500 mm and a thickness of 220 $\mu$m to opposite surfaces of a band-shaped current collector 14 having a width of 105 mm, a length of 1,500 mm and a thickness of 40 $\mu$m by a doctor blade process, and then, the resulting material was rolled to form a band-shaped polarizing electrode e whose thickness was 200 $\mu$m at one end, 150 $\mu$m at the other end, and 175 $\mu$m at a lengthwise bisecting location and which was decreased linearly from one end toward the other end, as shown in FIG. 11. A band-shaped negative electrode 15 was formed by the pair of polarizing electrodes e. In this case, the gradient of the band-shaped negative electrode 15 was (200–150)/1, 500. Further, a second separator 16 similar to that in Example-1 was superposed onto one of the band-shaped polarizing electrodes e to form a negative electrode laminated band 10.

Then, an electrode mixture similar to that described above was applied over a width of 95 mm, a length of 1,500 mm and a thickness of 220 $\mu$m by a doctor blade process to each of opposite surfaces of a band-shaped current collector 11 having a width of 105 mm, a length of 1,500 mm and a thickness of 40 $\mu$m. Then, the resulting material was rolled to form a band-shaped polarizing electrode e whose thickness was 200 $\mu$m at one end, 150 $\mu$m at the other end, and 175 $\mu$m at a lengthwise bisecting location and which was decreased linearly from one end toward the other end, as in the above-described band-shaped polarizing electrode e. A band-shaped positive electrode 12 was formed by the pair of polarizing electrodes e. In this case, the gradient of the band-shaped positive electrode 12 was likewise (200–150)/1,500. Further, a first separator 13 similar to that in Example-1 was superposed onto one of the band-shaped polarizing electrodes e to form a positive electrode laminated band 9.

Then, the first separator 13 of the positive electrode laminated band 9 was superposed onto the exposed band-shaped polarizing electrode e of the negative electrode laminated band 10. The superposed material was wound spirally in a counterclockwise direction, as shown in FIG. 9, about an end b having the maximum thickness, so that the second separator 16 of the negative electrode laminated band 10 was located on an outermost side, thereby producing an electrode winding 3. The electrode winding 3 and an electrolyte made by dissolving 1.5 moles of TEMA.BF$_4$ into a PC solvent were placed into a bottomed cylindrical body 4 of a container 2 having an inside diameter of 50 mm and a length of 130 mm, and the opening in the bottomed cylindrical body 4 was closed using a terminal plate 5. In closing the opening, the current colletors 11 and 14 of the positive electrode laminated band 9 and the negative electrode laminated band 10 were connected to a positive terminal 6 and a negative terminal 7 of the terminal plate 5, respectively. This cylindrical electric double-layer capacitor 1 is called example (4).

Figure 12:
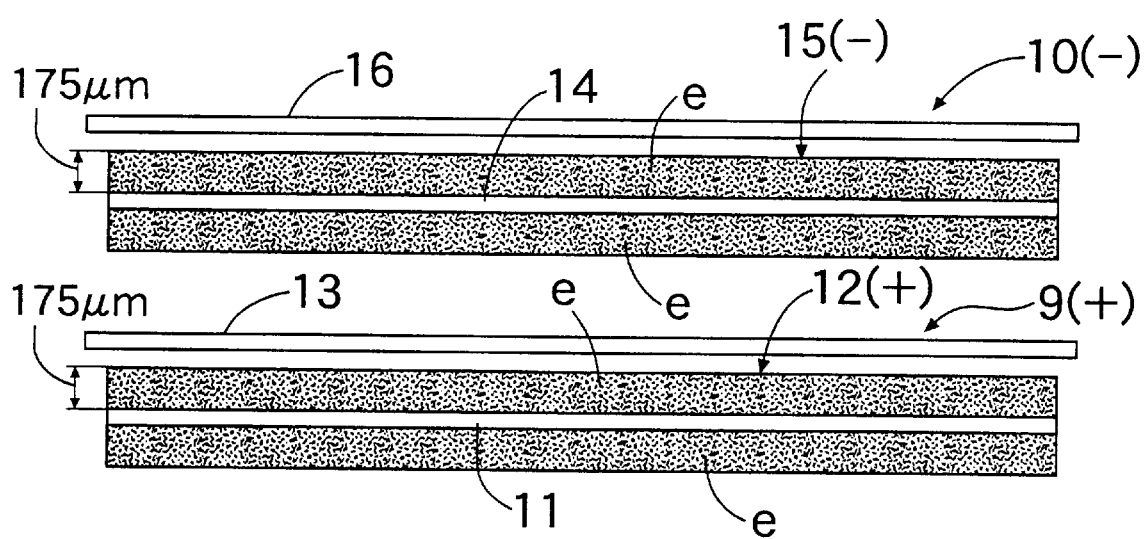
FIG. 12 is a diagram showing the relation between a positive electrode laminated band and a negative electrode laminated band in a comparative example.

FIG. 12 shows a comparative example which is similar to the comparative example in the Embodiment I.

[Performance of Electric Double-layer Capacitor]

Table 2 shows initial performances of examples (3) and (4) and the comparative example.

TABLE 2

|  | Initial performance | |
|---|---|---|
|  | Internal resistance (mΩ) | Electrostatic capacity (F) |
| Example (3) | 3.1 | 3020 |
| Example (4) | 3.2 | 3026 |
| Comparative Example | 4.0 | 2986 |

It can be seen from Table 2 that the initial performances of examples (3) and (4) are slightly more excellent than those of the comparative example.

A rate of increase in outside diameter of the electrode winding 3 after lapse of 30 minutes was determined for the examples (3) and (4) and the comparative example, thereby providing results shown in Table 3.

TABLE 3

|  | Rate of increase in outside diameter of electrode winding after lapse of 30 minutes |
|---|---|
| Example (3) | 0.5 |
| Example (4) | 0.3 |
| Comparative Example | 7.3 |

It can be seen from Table 3 that the rate of increase in outside diameter of the electrode winding 3 in examples (3) and (4) is quite small, as compared with the comparative example, because the absolute amount of band-shaped positive and negative electrodes 12 and 15 expanded was decreased in examples (3) and (4).

Figure 13:
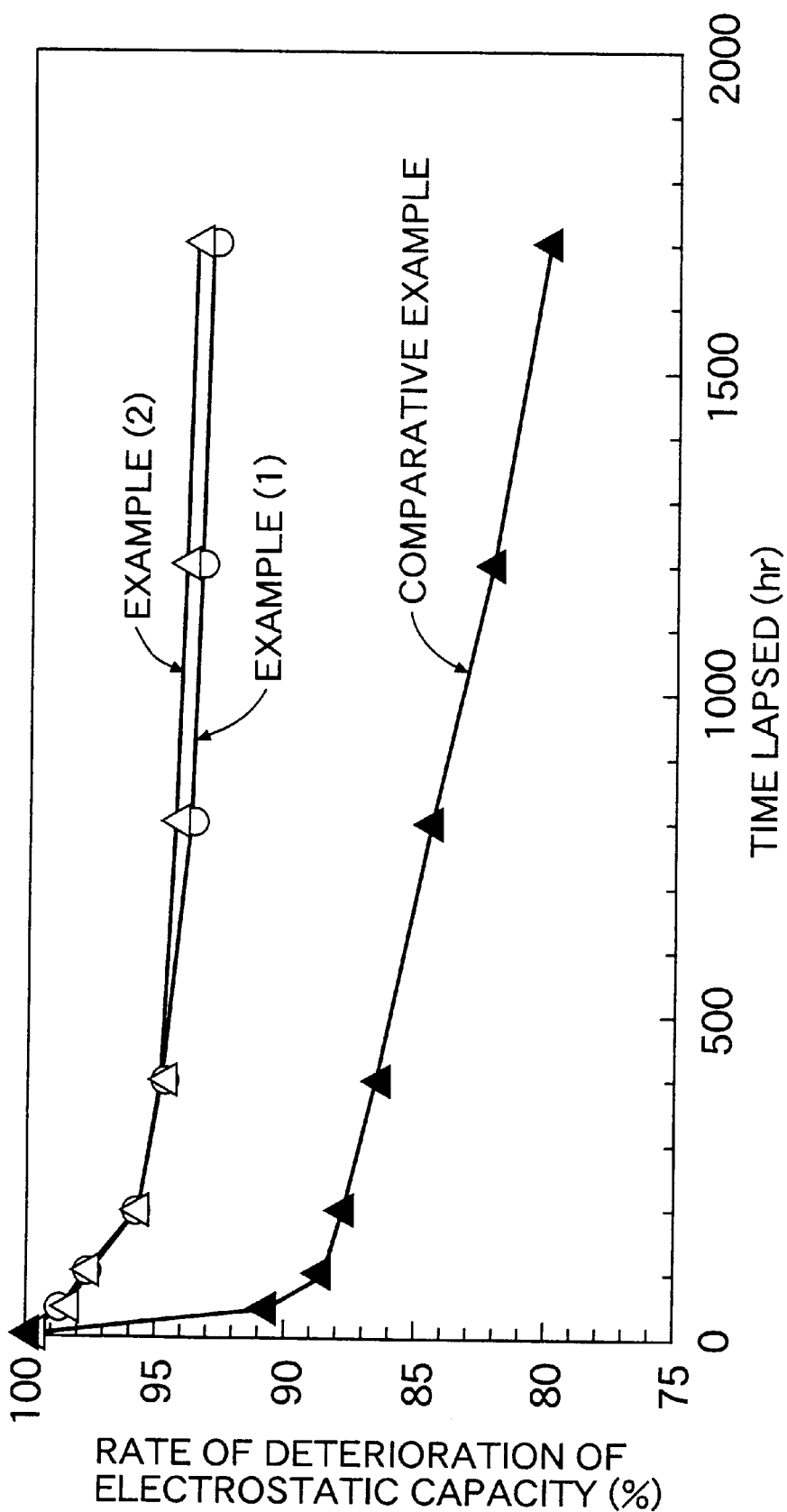
FIG. 13 is a graph showing the relationship between the time lapsed and the rate of deterioration of the electrostatic capacity.
Figure 14:
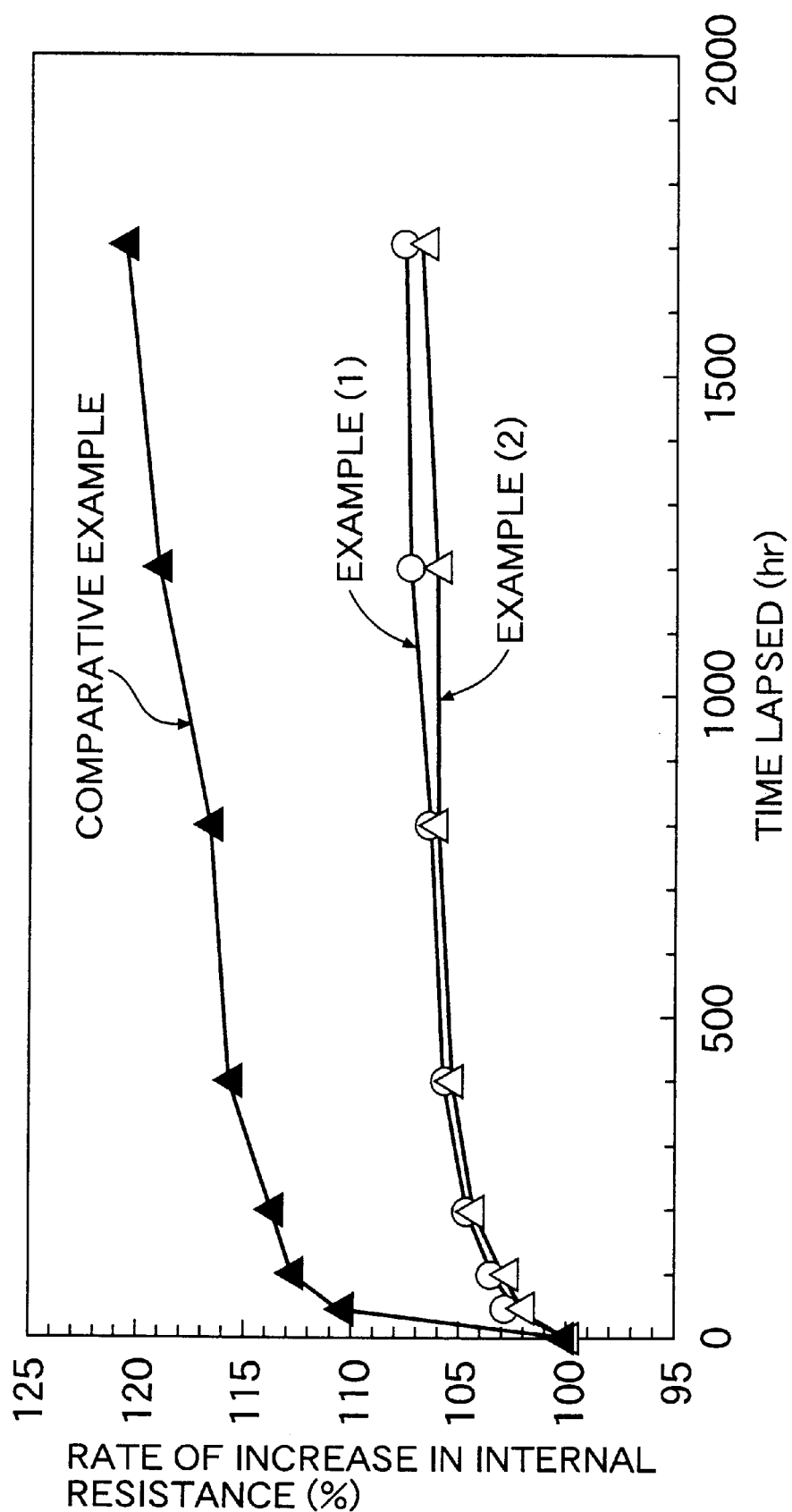
FIG. 14 is a graph showing the relationship between the time lapsed and the rate of increase in internal resistance.

Then, a rate of deterioration of the electrostatic capacity and a rate of increase in internal resistance for each of examples (3) and (4) and the comparative example were measured by carrying out the continuous application of voltage at 2.5 V for 1,700 hours in an atmosphere at 45° C. with the service life taken into consideration, thereby providing results shown in FIGS. 13 and 14.

It can be seen from FIGS. 13 and 14 that each of examples (3) and (4) is small in both of the rate of deterioration of the electrostatic capacity and the rate of increase in internal resistance and has a high service life, as compared with the comparative example, because the deformation or the like of the band-shaped positive and negative electrodes 12 and 15 is avoided, and the absolute values of the weights of the band-shaped positive and negative electrodes 12 and 15 are maintained approximately equivalent to those in the prior art. The reason why the rate of deterioration of the electrostatic capacity and the rate of increase in internal resistance were varied over a long time was not the expansion of the band-shaped positive and negative electrodes 12 and 15 but the generation of gas or the like.

According to Embodiment II, it is possible to provide a cylindrical electric double-layer capacitor designed so that the deterioration in the performance due to the expansion of the band-shaped positive and negative electrodes caused by the charging can be inhibited to the utmost.

What is claimed is:

1. A cylindrical electric double-layer capacitor comprising an electrode winding which is formed by superposing band-shaped positive and negative electrodes one on another with a first separator interposed therebetween, superposing a second separator onto one of said band-shaped positive and negative electrodes to provide a superposed material, and by spirally winding the superposed material such that said second separator is located on an outermost side, and a container having said electrode winding accommodated therein, wherein a cylindrical electrode is provided on an inner peripheral surface of said container opposed to an outer peripheral surface of said electrode winding, the polarity of said cylindrical electrode being set at a polarity opposite from the polarity of that portion of said one of said band-shaped positive and negative electrodes, which is located on an outermost periphery of said electrode winding.

2. A cylindrical electric double-layer capacitor comprising an electrode winding which is formed by interposing one separator between band-shaped positive and negative electrodes expanded by the charging, superposing another separator onto one of said band-shaped positive and negative electrodes to provide a superposed material, and by spirally winding the superposed material such that said another separator is located on an outermost side, and a container having said electrode winding accommodated therein, wherein the thickness of each of said positive and negative electrodes is decreased from a winding start point toward a winding end point.

3. The cylindrical electric double-layer capacitor of claim 2, wherein the thickness of each of said positive and negative electrodes is decreased step-wise from a winding start point toward a winding end point.

4. The cylindrical electric double-layer capacitor of claim 2, wherein the thickness of each of said positive and negative electrodes is decreased linearly from a winding start point to a winding end point.

* * * * *